United States Patent
Henriques et al.

(10) Patent No.: US 10,025,370 B2
(45) Date of Patent: Jul. 17, 2018

(54) OVERRIDING LATENCY TOLERANCE REPORTING VALUES IN COMPONENTS OF COMPUTER SYSTEMS

(71) Applicant: Apple Inc., Cupertino, CA (US)

(72) Inventors: Sergio J. Henriques, San Jose, CA (US); Manoj K. Radhakrishnan, Fremont, CA (US); Christopher J. Sarcone, Saratiga, CA (US)

(73) Assignee: APPLE INC., Cupertino, CA (US)

( * ) Notice: Subject to any disclaimer, the term of this patent is extended or adjusted under 35 U.S.C. 154(b) by 981 days.

(21) Appl. No.: 13/965,858

(22) Filed: Aug. 13, 2013

(65) Prior Publication Data

US 2015/0052404 A1    Feb. 19, 2015

(51) Int. Cl.
*G06F 1/32* (2006.01)

(52) U.S. Cl.
CPC ............ *G06F 1/3253* (2013.01); *G06F 1/325* (2013.01); *G06F 1/3215* (2013.01); *Y02D 10/151* (2018.01)

(58) Field of Classification Search
None
See application file for complete search history.

(56) References Cited

U.S. PATENT DOCUMENTS

| | | | | |
|---|---|---|---|---|
| 8,560,749 B2* | 10/2013 | Wang | ...................... | G06F 13/24 710/260 |
| 9,092,143 B1* | 7/2015 | Bappe | .................. | G06F 11/3485 |
| 2008/0126613 A1* | 5/2008 | Gilgen | .................. | G06F 13/387 710/36 |
| 2009/0249103 A1* | 10/2009 | Jeyaseelan | ............ | G06F 1/3203 713/324 |
| 2012/0059988 A1* | 3/2012 | Sano | ...................... | G06F 3/0611 711/114 |
| 2013/0007483 A1* | 1/2013 | Diefenbaugh | ........ | G06F 1/3206 713/320 |
| 2013/0343250 A1* | 12/2013 | Homchaudhuri | . | H04W 52/0251 370/311 |
| 2015/0006931 A1* | 1/2015 | Cooper | .................. | G06F 1/3268 713/323 |

* cited by examiner

*Primary Examiner* — Elias Mamo
(74) *Attorney, Agent, or Firm* — Fletcher Yoder PC

(57) ABSTRACT

The disclosed embodiments provide a system that operates a processor in a computer system. During operation, the system uses the processor to maintain a count of outstanding input/output (I/O) requests for a component in the computer system. Next, the system facilitates efficient execution of the processor by overriding a latency tolerance reporting (LTR) value for the component based on the count.

20 Claims, 4 Drawing Sheets

OVERRIDING LATENCY TOLERANCE REPORTING VALUES IN COMPONENTS OF COMPUTER SYSTEMS

BACKGROUND

Field

The disclosed embodiments relate to power management in computer systems. More specifically, the disclosed embodiments relate to techniques for reducing power consumption by overriding latency tolerance reporting (LTR) values in components of computer systems.

Related Art

A modern computer system typically includes a motherboard containing a processor and memory, along with a set of peripheral components connected to the motherboard via a variety of interfaces. For example, a Serial Advanced Technology Attachment (SATA) interface may facilitate data transfer between a storage device (e.g., hard disk drive, optical drive, solid-state drive, hybrid hard drive, etc.) and the motherboard, while a Peripheral Component Interconnect Express (PCIe) bus may enable communication between the motherboard and a number of integrated and/or add-on peripheral components.

In addition, use of the interfaces by the peripheral components may affect the power consumption of the computer system. For example, a Central Processing Unit (CPU) of the computer system may not be able to enter a low-power state while the CPU is executing and/or a PCIe interface is used by a peripheral component in the computer system. The CPU may further be kept from entering and/or staying in the low-power state if the peripheral component does not have the capability to provide a Latency Tolerance Reporting (LTR) value to the CPU and/or root complex of the PCIe interface. As a result, the CPU may be required to stay in a higher-power state to satisfy a default and/or minimum latency tolerance for the peripheral component, even if the peripheral component can tolerate a higher latency from the CPU.

Consequently, power consumption in computer systems may be improved by assessing latency tolerances of peripheral components in the computer systems and operating processors in the computer systems based on the assessed latency tolerances.

SUMMARY

The disclosed embodiments provide a system that operates a processor in a computer system. During operation, the system uses the processor to maintain a count of outstanding input/output (I/O) requests for a component in the computer system. Next, the system facilitates efficient execution of the processor by overriding a latency tolerance reporting (LTR) value for the component based on the count.

In some embodiments, using the processor to maintain the count of outstanding I/O requests for the component involves atomically incrementing the count upon receiving an I/O request associated with the component, and atomically decrementing the count upon detecting a completion of the I/O request.

In some embodiments, overriding the LTR value for the component based on the count involves reducing the LTR value upon detecting a first transition of the count from zero to nonzero, and increasing the LTR value upon detecting a second transition of the count from nonzero to zero.

In some embodiments, the increased LTR value facilitates increased use of a low-power state in the processor.

In some embodiments, the component is connected to the processor using a Peripheral Component Interconnect Express (PCIe) interface.

In some embodiments, the LTR value is overridden using an override register for a root port connected to the component.

In some embodiments, the root port is connected to one or more additional components, and the count further tracks outstanding I/O requests for the one or more additional comments.

In some embodiments, the component is associated with an inability to provide the LTR value.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
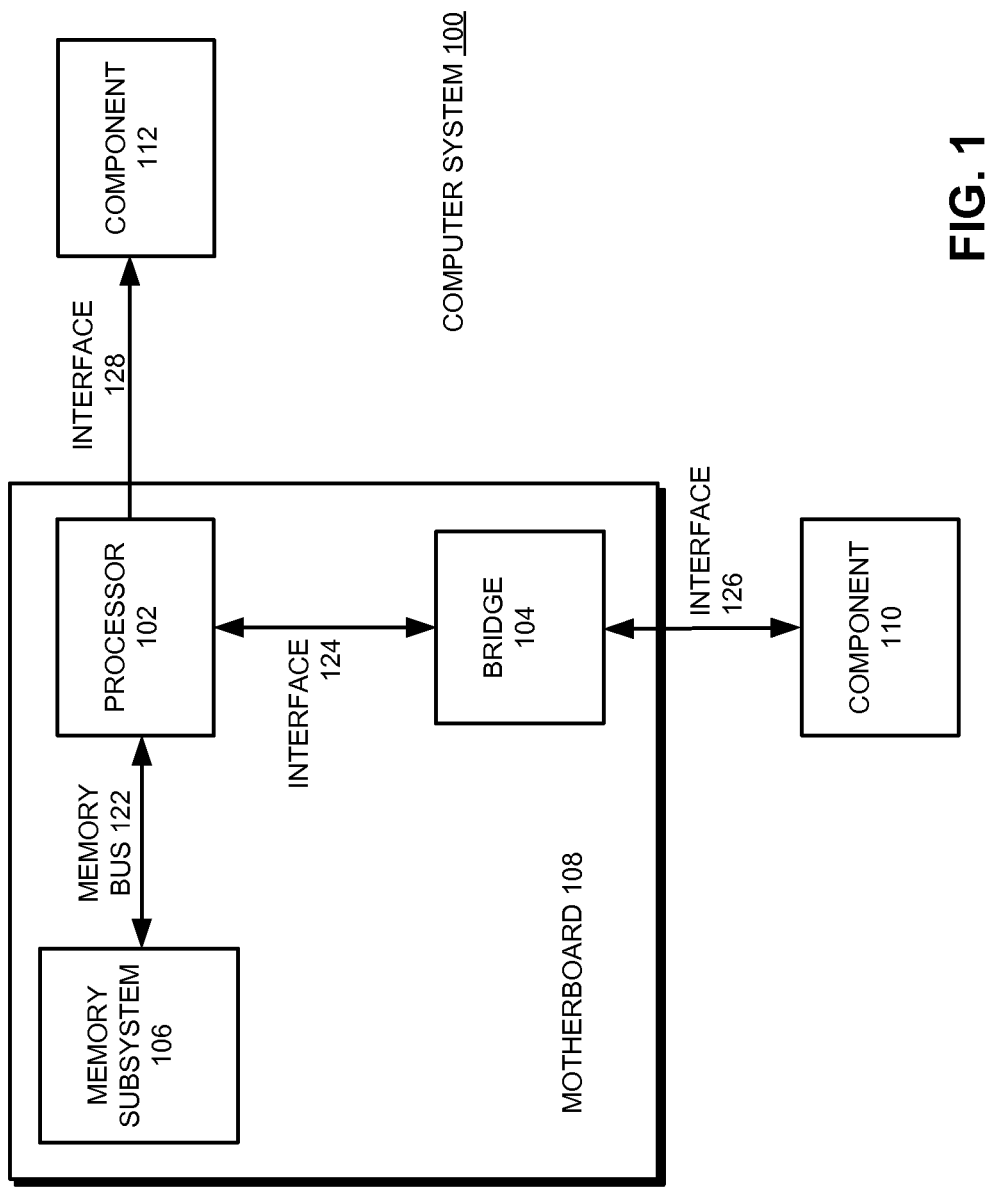
FIG. 1 shows a computer system in accordance with the disclosed embodiments.

FIG. 1 shows a computer system 100 in accordance with the disclosed embodiments. Computer system 100 may be a personal computer, laptop computer, workstation, media player, and/or portable electronic device. As shown in FIG. 1, computer system 100 includes a motherboard 108 containing a processor 102, a bridge chip 104, and an on-board memory subsystem 106 containing semiconductor memory. Computer system 100 also includes a set of components 110-112 (e.g., peripheral components) coupled to motherboard 108 by a set of interfaces 126-128.

Processor 102 may correspond to a central-processing unit (CPU) that is coupled to memory subsystem 106 using a memory bus 122. Data transmission between processor 102 and memory subsystem 106 may be managed by a memory controller (not shown) integrated into processor 102 and/or connected to processor 102.

Processor 102 is also coupled to bridge chip 104 (e.g., southbridge, Platform Controller Hub (PCH), etc.) through an interface 124 such as a Flexible Display Interface (FDI) and/or Direct Media Interface (DMI). Bridge chip 104 may enable communication between processor 102 and other components in computer system 100. For example, bridge chip 104 may connect processor 102 to a network interface, storage device, camera, audio interface, and/or other component 110 through a Peripheral Component Interconnect Express (PCIe) interface 126 with component 110. Alternatively, some components (e.g., component 108) may be coupled directly to processor 102. For example, component 112 may be a graphics-processing unit (GPU) that communicates with processor 102 over a PCIe interface 128 (e.g., PCIe link) with processor 102 instead of bridge chip 104.

Those skilled in the art will appreciate that the operation and/or power consumption of processor 102 may be affected by the use of interfaces 126-128 by components 110-112 connected to interfaces 126-128. For example, processor 102 may be kept in an active state with significant power consumption while processor 102 is executing and/or processing input/output (I/O) requests from components 110-112. Processor 102 may then enter a low-power state (e.g., idle state, sleep state) if processor 102 is not executing and/or processing input/output (I/O) requests from components 110-112. However, processor 102 may be prevented from entering a "deep" low-power state if a component specifies and/or is assigned a Latency Tolerance Reporting (LTR) value that is lower than the amount of time needed to transition processor 102 out of the deep low-power state, even if the component can tolerate a higher latency than the specified and/or assigned LTR value. Consequently, the component's inability to provide an LTR value and/or the component's reporting of an overly conservative (e.g., low) LTR value may interfere with the energy-efficient operation of processor 102 and/or computer system 100.

In one or more embodiments, computer system 100 includes functionality to facilitate efficient execution of processor 102 by overriding LTR values for components 110-112 if components 110-112 lack the ability to specify LTR values and/or specify LTR values that are not optimal for computer system 100. As discussed in further detail below with respect to FIGS. 2-3, the LTR values may be overridden by processor 102 through communication with ports (e.g., PCIe ports) connected to components 110-112 on processor 102 and/or bridge chip 104.

In addition, the LTR values provided by processor 102 to a given port may be based on the number of outstanding I/O requests for the component connected to the port. For example, processor 102 may maintain a low LTR value for a component if the component has outstanding I/O requests with processor 102 to facilitate timely processing of the outstanding I/O requests. Conversely, processor 102 may increase the LTR value after all outstanding I/O requests from the component have been processed to allow processor 102 to enter a deeper low-power state and, in turn, reduce the power consumption of computer system 100. In other words, processor 102 may adapt LTR values for components 110-112 based on the execution of components 110-112 and/or the use of interfaces 126-128 by components, thus facilitating both efficient execution of processor 102 and processing of I/O requests from components 110-112 within a reasonable timeframe.

Figure 2:
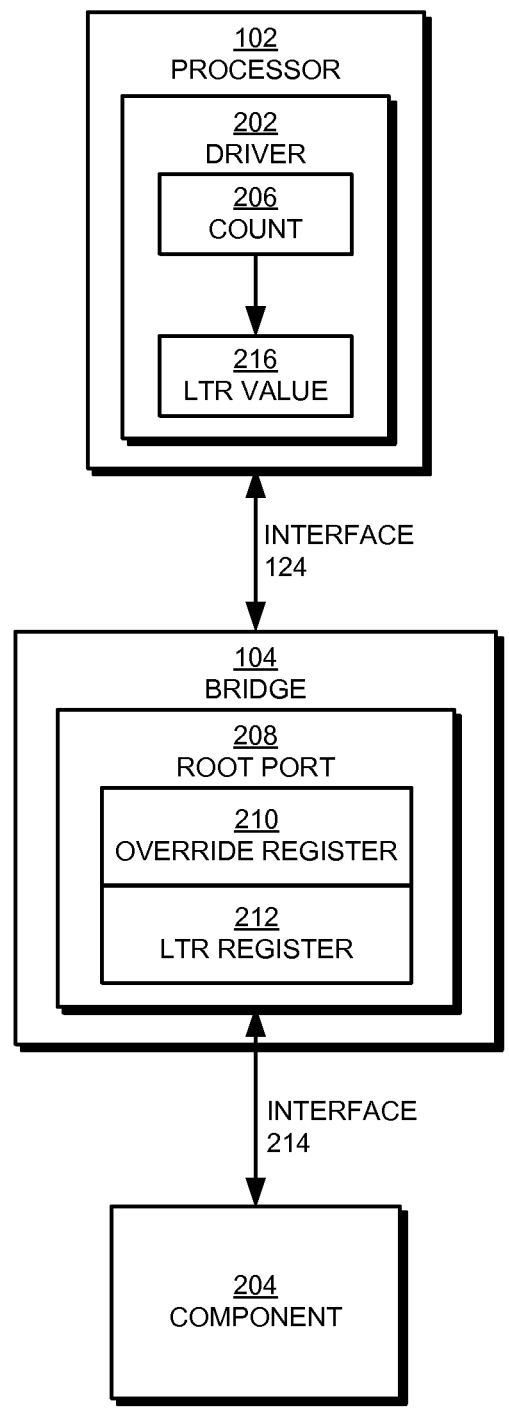
FIG. 2 shows a system for overriding a latency tolerance reporting (LTR) value for a component in a computer system in accordance with the disclosed embodiments.

FIG. 2 shows a system for overriding an LTR value 216 for a component 204 in a computer system (e.g., computer system 100 of FIG. 1) in accordance with the disclosed embodiments. As shown in FIG. 2, component 204 may be connected to bridge chip 104 using an interface 214 (e.g., PCIe interface) with bridge chip 104. Communications from component 204 may then be relayed from bridge chip 104 to processor 102 over interface 124 (e.g., DMI, FDI).

As mentioned above, LTR value 216 may be overridden by processor 102 if component 204 does not have the capability to specify LTR value 216 over interface 214 and/or provides an LTR value that does not facilitate optimal execution of processor 102 and/or component 204. If component 204 is not capable of providing LTR value 216, component 204 may be assigned a default and/or minimum LTR value 216 that is too low to allow processor 102 to enter a deep low-power state. For example, a solid-state drive (SSD) that lacks the ability to provide LTR value 216 to bridge chip 104 may be assigned a minimum LTR value that is less than the 3-millisecond period required to transition processor 102 out of the deepest low-power states available, such as the C7 to C10 states. Because the assigned LTR value prevents processor 102 from utilizing the deepest low-power states, the use of component 204 in the computer system may unnecessarily increase the power consumption of processor 102 and/or the computer system.

Conversely, component 204 may provide an LTR value that does not allow processor 102 and/or component 204 to satisfy the requirements of the computer system's platform. For example, a network interface may advertise a high LTR value 216 that interferes with the ability of processor 102 to process network packets from the network interface in a timely manner. In turn, delays in the processing of network packets may increase the latency of the computer system's network connection and/or result in packet loss and/or degraded performance of network-enabled applications on the computer system.

To determine a more suitable LTR value 216 for component 204, a driver 202 (e.g., device driver) and/or other device-management mechanism for component 204 may execute on processor 102 and maintain a count 206 of outstanding I/O requests for component 204. For example, driver 202 may receive the I/O requests from an operating system of the computer system. Driver 202 may then transmit the I/O requests to component 204 using memory-mapped I/O.

In addition, driver 202 may atomically increment count 206 upon receiving an I/O request associated with the component and atomically decrement count 206 upon detecting a completion of the I/O request. For example, driver 202 may use a semaphore, lock, mutex, and/or other mechanism for controlling access to count 206 to perform atomic incrementing and decrementing of count 206.

Next, driver 202 may override LTR value 216 based on count 206. In particular, driver 202 may reduce LTR value 216 upon detecting a first transition of count 206 from zero to nonzero and increase LTR value 216 upon detecting a second transition of count 206 from nonzero to zero. For example, driver 202 may set LTR value 216 to a small value (e.g., 10 microseconds) after detecting the first transition and a larger value (e.g., 3 milliseconds) after detecting the second transition. Because the first transition indicates the presence of outstanding I/O requests for component 204, the reduced LTR value 216 may facilitate timely processing of the outstanding I/O requests by processor 102. On the other hand, the lack of outstanding I/O requests represented by the second transition may indicate that processor 102 is free to enter a low-power state, thus prompting an increase of LTR value 216 to one that allows processor 102 to utilize the low-power state.

Driver 202 may also modify LTR value 216 during transitions of count 206 to other values. For example, driver 202 may increase LTR value 216 from 10 milliseconds to 20 milliseconds after count 206 reaches 10 because the latency on the first I/O is more important than the latency associated with processing 10 I/Os.

Finally, driver 202 may adjust LTR value 216 to accommodate requirements and/or system preferences for performance and/or power consumption. For example, driver 202 may lower LTR value 216 to improve the performance of the computer system and increase LTR value 216 to improve power savings in the computer system.

Once LTR value 216 is updated based on count 206, driver 202 may perform the override using an override register 210 in a root port 208 of bridge chip 104 that is connected to component 204. For example, driver 202 may write LTR value 216 to a memory-mapped override register 210 in root port 208, and root port 208 and/or bridge chip 104 may propagate LTR value 216 from override register 210 to an LTR register 212 for root port 208 and/or component 204. As a result, LTR value 216 may replace a default LTR value in LTR register 212 and/or an LTR value provided by component 204.

Alternatively, propagation of LTR value 216 to LTR register 212 may depend on the existing value in LTR register 212. For example, LTR value 216 may be propagated to LTR register 212 only if LTR value 216 is higher than the existing value to reduce the power consumption of processor 102. On the other hand, LTR value 216 may be propagated to LTR register 212 only if LTR value 216 is lower than the existing value to improve the performance of processor 102.

Driver 202 may also adapt count 206 and LTR value 216 for use with multiple components connected to root port 208. For example, the components may be connected to root port 208 through a host bus adapter (HBA). Count 206 may thus track outstanding I/O requests for all of the components, and LTR value 216 may be adjusted to the lowest tolerance among the components.

Figure 3:
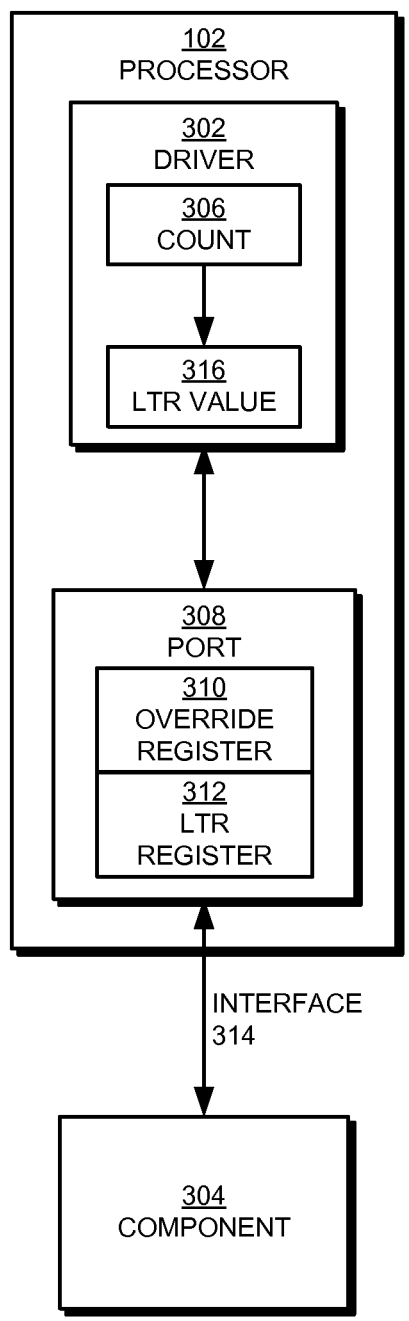
FIG. 3 shows a system for overriding an LTR value for a component in a computer system in accordance with the disclosed embodiments.

FIG. 3 shows a system for overriding an LTR value for a component 304 in a computer system (e.g., computer system 100 of FIG. 1) in accordance with the disclosed embodiments. As with the system of FIG. 2, a driver 302 and/or other device-management mechanism for component 304 may execute on processor 102 and use a count 306 of outstanding I/O requests for component 304 to override an LTR value 316 for the component.

Unlike component 204 of FIG. 2, component 304 is connected directly to a port 308 on processor 102 instead of a port (e.g., root port 208 of FIG. 2) on bridge chip 104. For example, component 304 may be a GPU that uses a PCIe interface 314 with processor 102 to communicate directly with processor 102. As a result, LTR value 316 may be written to an override register 310 on processor 102 using memory-mapped I/O. LTR value 316 may then be propagated from override register 310 to an LTR register 312 for port 308 and/or component 304 based on the LTR values found in override register 310 and LTR register 312.

Figure 4:
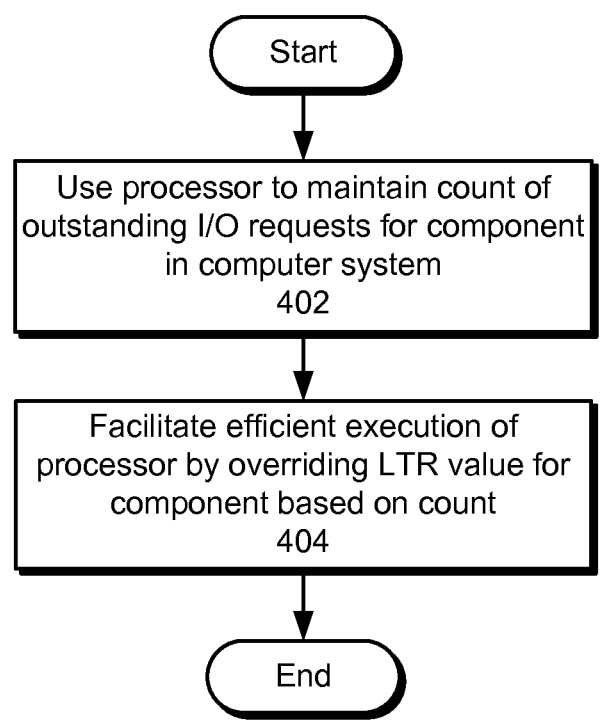
FIG. 4 shows a flowchart illustrating the process of operating a processor in a computer system in accordance with the disclosed embodiments.

FIG. 4 shows a flowchart illustrating the process of operating a processor in a computer system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, the processor is used to maintain a count of outstanding I/O requests for a component in the computer system (operation 402). For example, the processor may atomically increment the count upon receiving an I/O request associated with the component and atomically decrement the count upon detecting completion of the I/O request.

Next, efficient execution of the processor is facilitated by overriding an LTR value for the component based on the count (operation 404). For example, the LTR value may be reduced upon detecting a first transition of the count from zero to nonzero and increased upon detecting a second transition of the count from nonzero to zero. The increased LTR value may facilitate increased use of a low-power state in the processor, thus reducing the power consumption of the processor.

In addition, the LTR value may be overridden using an override register for a root port of a PCIe interface between the component and the processor. The LTR value may then be propagated from the override register to the LTR register for the root port and/or component based on the LTR values in both registers. If multiple components are connected to the root port (e.g., via an HBA), the processor may track outstanding I/O requests for all components connected to the root port and adjust the LTR value based on the lowest latency tolerance among the components.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for operating a processor in a computer system, comprising:
    using the processor to maintain a count of outstanding input/output (I/O) requests for a component coupled to the processor through a bridge in the computer system; and
    facilitating efficient execution of the processor by causing the processor to override a latency tolerance reporting (LTR) register in the bridge for the component based on the count, wherein overriding the LTR comprises:
        upon detecting a first transition of the count from zero to a first number of counts, reducing a LTR value stored in the LTR register from a first latency tolerance to a second latency tolerance; and upon detecting a second transition of the count from the first number of counts to a second number of counts, increasing the LTR value stored in the LTR register from the second latency tolerance to a third latency tolerance, wherein the second number of counts is larger than the first number of counts, and wherein the second latency tolerance is higher than the first latency tolerance.

2. The computer-implemented method of claim 1, wherein using the processor to maintain the count of outstanding I/O requests for the component involves:
   upon receiving an I/O request associated with the component, atomically incrementing the count; and
   upon detecting a completion of the I/O request, atomically decrementing the count.

3. The computer-implemented method of claim 1, wherein overriding the LTR register for the component based on the count involves:
   upon detecting a third transition of the count from the first number of counts to zero, increasing the LTR value to the first latency tolerance; and
   upon detecting a fourth transition of the count from the second number of counts to the first number of counts, decreasing the LTR value to the second latency tolerance.

4. The computer-implemented method of claim 3, wherein the increased LTR value facilitates increased use of a low-power state in the processor.

5. The computer-implemented method of claim 1, wherein the bridge comprises a southbridge, a platform controller hub, or a Peripheral Component Interconnect Express (PCIe) interface.

6. The computer-implemented method of claim 1, wherein the LTR register is overridden using an override register for a root port connected to the component.

7. The computer-implemented method of claim 6, wherein the root port is connected to one or more additional components, and
   wherein the count further tracks outstanding I/O requests for the one or more additional components.

8. The computer-implemented method of claim 1, wherein the component is associated with an inability to provide an LTR value.

9. A system for operating a processor in a computer system, comprising:
   a device-management mechanism executing on the processor; and
   a bridge between the processor and a component in the computer system,
   wherein the device-management mechanism is configured to:
   maintain a count of outstanding input/output (I/O) requests for the component; and
      facilitate efficient execution of the processor by overriding a latency tolerance reporting (LTR) register in the bridge for the component based on the count with an override latency value, wherein the override latency value comprises:
         a first value, when the number of counts is greater than zero but smaller than a first count;
         a second value smaller than the first value when the override latency is a second value greater than zero but smaller than a first count; and
         a third value greater than the second value when the override latency is greater than the second value.

10. The system of claim 9, wherein using the processor to maintain the count of outstanding I/O requests for the component involves:
   upon receiving an I/O request associated with the component, atomically incrementing the count; and
   upon detecting a completion of the I/O request, atomically decrementing the count.

11. The system of claim 9, wherein overriding the LTR register for the component based on the count involves:
   upon detecting a first transition of the count from zero to nonzero, reducing an LTR value stored in the LTR register; and
   upon detecting a second transition of the count from nonzero to zero, increasing the LTR value.

12. The system of claim 9, wherein the bridge is a Peripheral Component Interconnect Express (PCIe) interface.

13. The system of claim 12, wherein the causing the processor to override the LTR register comprises using an override register for a root port connected to the component.

14. The system of claim 9, wherein the component is associated with an inability to provide an LTR value.

15. A tangible, non-transitory, computer-readable storage medium storing instructions that when executed by a computer cause the computer to perform a method for operating a processor in a computer system, the method comprising:
   using the processor to maintain a count of outstanding input/output (I/O) requests for a component in the computer system coupled to the processor via a bridge; and
   facilitating efficient execution of the processor by causing the processor to override a latency tolerance reporting (LTR) register in the bridge for the component based on the count, at least in part, by:
      decreasing a value stored in the LTR register when the number of counts transitions from a first count number smaller than a first count threshold to a second count number greater than the first count threshold and smaller than a second count threshold; and
      increasing the value stored in the LTR register when the number of counts transitions from a third count number smaller than the second count threshold to a fourth count number greater than the second count threshold.

16. The tangible, non-transitory, computer-readable storage medium of claim 15, wherein using the processor to maintain the count of outstanding I/O requests for the component involves:
   upon receiving an I/O request associated with the component, atomically incrementing the count; and
   upon detecting a completion of the I/O request, atomically decrementing the count.

17. The tangible, non-transitory, computer-readable storage medium of claim 15, wherein overriding the LTR register for the component based on the count involves:
   upon detecting a first transition of the count from zero to nonzero, reducing an LTR value stored in the LTR register; and
   upon detecting a second transition of the count from nonzero to zero, increasing the LTR value.

18. The tangible, non-transitory, computer-readable storage medium of claim 15, wherein the bridge comprises a south bridge, a platform controller hub, or a Peripheral Component Interconnect Express (PCIe) interface.

19. The tangible, non-transitory, computer-readable storage medium of claim 18, wherein the causing the processor to override the LTR register comprises using an override register for a root port connected to the component.

20. The tangible, non-transitory, computer-readable storage medium of claim 15, wherein the component is associated with an inability to provide an LTR value.

* * * * *